United States Patent
Rouleau et al.

(10) Patent No.: US 8,875,091 B1
(45) Date of Patent: Oct. 28, 2014

(54) INTEGRATED DEVELOPMENT AND OPERATIONS SOLUTION

(71) Applicant: Bank of America Corporation, Charlotte, NC (US)

(72) Inventors: Michael David Rouleau, Davidson, NC (US); Timothy Marshall Edwards, Charlotte, NC (US); Phillip D. Wheless, McKinney, TX (US); Christopher Scott Nowak, Huntersville, NC (US); Apurva M. Patel, Belle Mead, NJ (US); Kristian Nelson, Orlando, FL (US); Samuel L. Binder, Chadds Ford, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/922,917

(22) Filed: Jun. 20, 2013

(51) Int. Cl.
  *G06F 9/44* (2006.01)
  *G06Q 10/06* (2012.01)
  *G06F 9/445* (2006.01)

(52) U.S. Cl.
  CPC ........ *G06Q 10/06* (2013.01); *G06F 8/10* (2013.01); *G06F 8/30* (2013.01); *G06F 8/60* (2013.01)
  USPC .................. 717/101; 717/102; 717/124

(58) Field of Classification Search
  None
  See application file for complete search history.

(56) References Cited

U.S. PATENT DOCUMENTS

| | | | | |
|---|---|---|---|---|
| 8,694,969 B2* | 4/2014 | Bernardini et al. | | 717/124 |
| 2006/0271581 A1* | 11/2006 | Sanjar et al. | | 707/102 |
| 2007/0028220 A1* | 2/2007 | Miller et al. | | 717/124 |
| 2009/0007073 A1* | 1/2009 | Huang et al. | | 717/124 |
| 2010/0125618 A1* | 5/2010 | Dutta et al. | | 707/822 |
| 2012/0072367 A1* | 3/2012 | Reisbich | | 705/348 |
| 2012/0144363 A1* | 6/2012 | Bernardini et al. | | 717/101 |
| 2012/0227027 A1* | 9/2012 | Boulila | | 717/101 |
| 2012/0331442 A1* | 12/2012 | Chen | | 717/102 |
| 2013/0014079 A1* | 1/2013 | Chaar et al. | | 717/101 |
| 2013/0080992 A1* | 3/2013 | Chaar et al. | | 717/102 |
| 2013/0185693 A1* | 7/2013 | Chaar et al. | | 717/102 |
| 2013/0212552 A1* | 8/2013 | He | | 717/101 |
| 2013/0254738 A1* | 9/2013 | Chaar et al. | | 717/101 |
| 2013/0339921 A1* | 12/2013 | Bassin et al. | | 717/101 |
| 2013/0346163 A1* | 12/2013 | Kemmer et al. | | 705/7.41 |
| 2014/0096105 A1* | 4/2014 | Bernardini et al. | | 717/102 |
| 2014/0173574 A1* | 6/2014 | Schmidt et al. | | 717/143 |

OTHER PUBLICATIONS

Oracle, "Oracle Unified Method (OUM) Oracle's Full Lifecycle Method for Deploying Oracle-Based Business Solutions", Feb. 2014, Oracle Corporation, pp. 1-15; <http://www.oracle.com/us/products/consulting/resource-library/oracle-unified-method-069204.pdf>.*

(Continued)

*Primary Examiner* — Thuy Dao
*Assistant Examiner* — Ben C Wang
(74) *Attorney, Agent, or Firm* — Michael A. Springs; Moore & Van Allen PLLC; Nicholas C. Russell (57) ABSTRACT

Embodiments of the invention are directed to a system, method, or computer program product for integrated development and operations solution. The claimed invention aims to automate the implementation of deploying software from development to production by leveraging familiar processes and technologies to increase communication and collaboration between the development and operations teams. Further, the claimed invention enables continuous delivery of change by providing visibility into the status change in all environments, insight into release/change status (delays, cancellations, or the like), enabling quality driven change progression and will consolidate tools as appropriate.

18 Claims, 8 Drawing Sheets

(56) References Cited

OTHER PUBLICATIONS

Nayan B. Ruparelia, "Software Development Lifecycle Models", May 2010, ACM, ACM SIGSOFT Software Engineering Notes, vol. 35, No. 3, pp. 8-13; <http://dl.acm.org/citation.cfm?id=1764810.1764814&coll=DL&dl=GUIDE&CFID=417717926&CFTOKEN=68174932>.*

Toffolon et al., "An Iterative Meta-Lifecycle for Software Development, Evolution and Maintenance", 2008 IEEE, ICSEA'08, Oct. 26-31, 2008, pp. 284-289; <http://ieeexplore.ieee.org/stamp/stamp.jsp?tp=&arnumber=4668121>.*

\* cited by examiner

INTEGRATED DEVELOPMENT AND OPERATIONS SOLUTION

BACKGROUND

An enterprise may employ many varied processes, procedures, and tools to implement change. Depending on the applications that are supported by a technology team the process may be manual, semi-automated, or fully automated. It is imperative to determine a consolidated process and an effective communication mechanism for teams supporting the customer to manage and document detail the steps of change. Further, it is important to achieve high levels of transparency to identify the exact location of the change in a lifecycle and the personnel associated with the change.

BRIEF SUMMARY

Embodiments of the present invention address the above needs and/or achieve other advantages by providing apparatuses (e.g., a system, computer program product and/or other devices) and methods for an integrated development and operations solution. The claimed invention aims to automate the implementation of deploying software from development to production by leveraging familiar processes and technologies to increase communication and collaboration between the development and operations teams.

An important task in the development of a software application is identifying the requirements from a customer service request. Once the general requirements are gathered from the client, an analysis of the scope of the application should be determined and clearly stated. Most development processes are executed as a synchronized effort between one or more teams involved in the application development process. Improper synchronization may result in lack of accountability between various teams and overall variance in the application development process. The present invention aims to automate the development process with the help of automated pre-defined triggers set up to identify specific actions associated with the development process and execute specific processes accordingly.

In some embodiments, the integrated development and operations solution may provide better visibility into the quality of the development process at each stage and will deliver an understanding of the risk prior to implementation in the environment.

Embodiments of the invention relate to systems, methods, and computer program products for receiving a customer service request, wherein the customer service request includes a complete description of a product to be developed; identifying one or more requirements necessary to execute the customer service request, wherein the one or more requirements include at least one of a functional and non-functional requirement; receiving data associated with the one or more requirements and store the data in a data repository; retrieving data associated with the one or more requirements from the data repository and create a build, wherein creating a build includes converting the data associated with the one or more requirements into a product capable of being deployed; determining that a build is successful, wherein determining that a build is successful includes the build passing a threshold based quality assessment; storing the product created by the successful build in a build repository and stage the product for deployment, wherein staging includes pre-processing; deploying the product and determine a successful deployment, wherein determining a successful deployment includes the product meeting all the requirements; and releasing the product to end user.

In some embodiments, functional requirement describes a product behavior, wherein product behavior comprises product performance within a deployed environment and non-functional requirements specifies criteria that can be used to judge the functionality of the product to be developed.

In some embodiments, the threshold based quality assessment to determine a successful build includes: subjecting the build to at least one build-time code quality scan; comparing the result to a pre-defined threshold, wherein pre-defined threshold is one or more errors; and determining if the build passes the pre-defined threshold.

In some embodiments, the plurality of test environments further include: one or more test machines, wherein the one or more test machines is a simulation of an environment similar to an environment in which the application is to operate; and a target environment, wherein target environment is a simulation an environment similar to the environment in which one or more applications dependent on each other in an integrated manner are to operate.

In some embodiments, determining a successful deployment further includes: deploying the product created by the successful build in the plurality of test environments; comparing the functionality of the product deployed to the functional and non-functional requirements; and determining based on the comparison, that the product deployed satisfies the functional and non-functional requirements and is error free.

In some embodiments, the product to be developed is at least one of a single application, an integration of a plurality of applications, or a change implementation.

In some embodiments, the build process and the deploy process are automatically triggered based on at least the functional and non-functional requirements identified.

In some embodiments, creating a build further includes: at least one of identifying build dependencies and integrating the build dependencies with the build automatically and integrating reports generated by issue management into the build automatically.

In some embodiments, deployment is integrated with at least one of a plurality of mainframe systems, wherein the plurality of mainframe systems is a back-end server.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, references will now be made to the accompanying drawings, wherein:

DETAILED DESCRIPTION OF THE
EMBODIMENTS OF THE INVENTION

Embodiments of the present invention now may be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be any organization, business, merchant, or corporation. In some embodiments, an entity may be an organization, business, or the like in the business of moving, investing, or lending money, dealing in financial instruments, or providing financial services, such as a financial institution, or the like. This may include commercial banks, thrifts, federal and state savings banks, savings and loan associations, credit unions, investment companies, insurance companies and the like.

In some embodiments, a "customer" as used herein may be an internal development team, a partner needing services, a technology specialist, a business planner, an analyst, internal operations specialist, or a similar agent associated with the entity.

In some embodiments, a "vendor" as used herein may be a developer, an automation engineer, a release manager, a development manager, or any combination thereof, involved in developing the application.

In some embodiments, a "product" as used herein may be an application, an integrated group of applications, change implementation, or a similar object being developed in the project environment.

The present invention embraces an integrated development and operations solution to provide transparency to change, drive accountability, provide an efficient communication mechanism, and detail a streamlined continuous process. The invention is described in detail below can be explained as the integration of the engagement services, automation services, release orchestration, and asset management.

Figure 1:
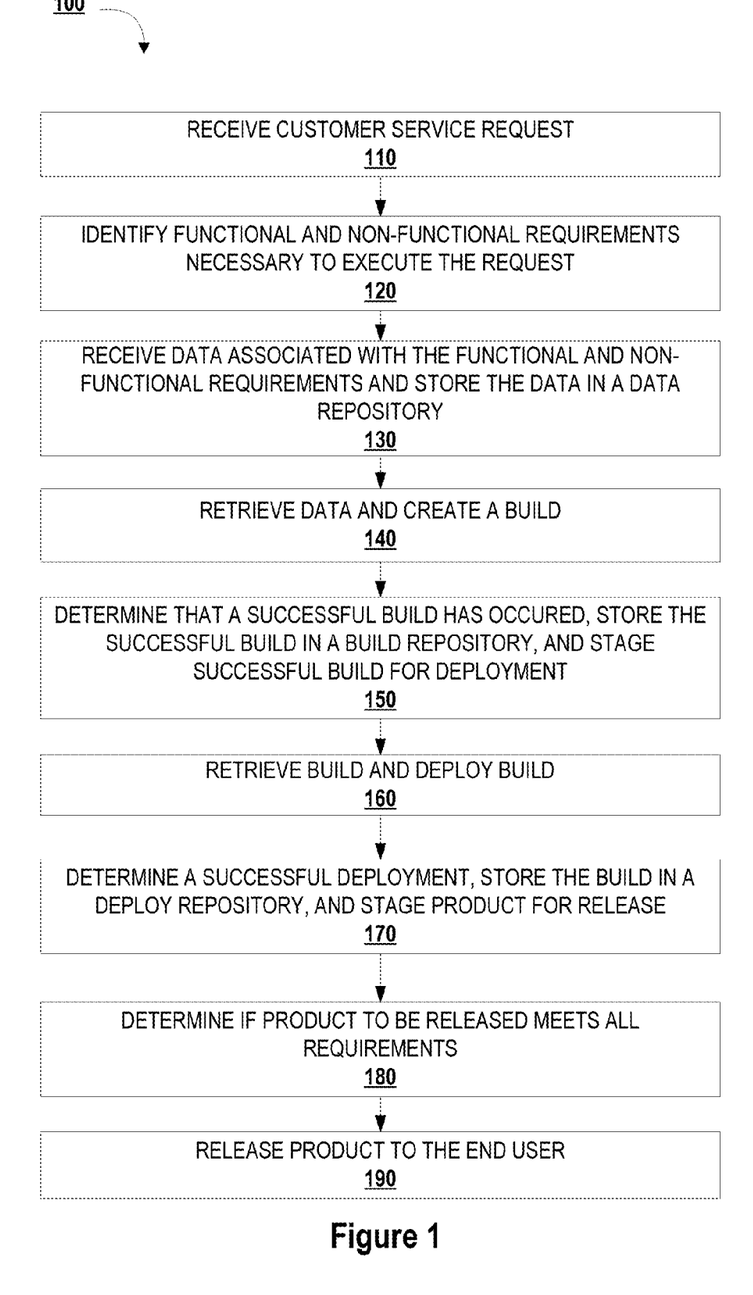
FIG. 1 provides a high level process flow illustrating the integrated development and operations solution, in accordance with one embodiment of the present invention.

FIG. 1 shows a high level process flow of the system 100. As shown in block 110, the system receives a customer service request. In one aspect, the customer service request may be associated with one or more customers requesting a change, update, or new application. In some embodiments, the customer service request may be a change implementation in an existing application. In some other embodiments, the customer service request may be developing a new application altogether. In response to receiving a customer service request, as shown in block 120, the system identifies functional and non-functional requirements necessary to execute the customer service request. In some embodiments, the one or more requirements may be functional and/or non-functional requirements. Typically, functional requirement defines one or more functions of the product to be developed and non-functional requirement specifies the criteria that can be used to judge the operation of the product to be developed. In some embodiments, identifying one or more requirements may include upfront data collection which details infrastructure requirements, quality requirements, outline of the application, application development timeline and the like. As shown in block 130, in response to receiving a customer service request, the system receives data associated with the one or more requirements and stores the data in a data repository. In some embodiments, the data is a source code written by a developer. The system then retrieves the data from the code repository and creates a build, as shown in block 140. Typically, the process of converting source code files into products that can be deployed in an environment is referred to as a build. In some embodiments, a build may be defined as the process of converting source code files into a product capable of being deployed.

In response to creating a build, the system then determines a successful build, stores the product created by the successful build in a build repository, and stages the product for deployment, as shown in block 150. In some embodiments, to determine if the build is successful, it is subjected to a threshold based quality assessment. In one aspect, the build is subjected to at least one build-time code quality scan. Typically, a build-time code quality scan is used to determine if the product created by the successful build is working as per functional requirements, identify potential bugs, and the like. In response to subjecting the build to a build-time code quality scan, the result is then compared to a pre-defined threshold. In some embodiments, the pre-defined threshold may include a pass/fail result which may be used to determine if the build may proceed to the deployment stage. In some embodiments, if a product created by the build does not pass the pre-defined threshold, the developer may be notified immediately to fix the issue identified before staging the product for deployment. Once the build passes the pre-defined threshold, it is deemed a successful build and is staged for deployment. In response to determining a successful build, the system retrieves the product from the build repository and deploys the product, as shown in block 160.

Once the product is deployed, the system determines if the deployment is successful, stores the build in a deploy repository, and stages the product for release, as shown in block 170. Typically, a successful deployment is determined based on whether the product meets functional and non-functional requirements as identified from the customer service request. In some embodiments, determining a successful deployment further includes deploying the product in a plurality of test environments. The test environments compare the functionality of the product deployed to the one or more requirements and determining if the product satisfies all the functional and non-functional requirements as identified from the customer service request.

In some embodiments, a plurality of test environments may include a test machine and a target environment. Typically, a test machine is used to test individual applications. The application is installed in the test machines with hardware and software specifications similar to the environment in which the application is to operate, and any functional issues associated with the application are identified. In response to identifying one or more issues, the developer is notified and necessary changes are made to eradicate the one or more issues identified. A target environment is a run time environment which is used to test multiple builds developed as a product to operate in an integrated manner. A successful deployment is determined by comparing the functionality of the product deployed to the functional and non-functional requirements as identified from the customer service request. If the product deployed satisfies all the requirements, it is deemed successful. Once a successful deployment is determined, the system then checks if the product to be released meets all the requirements, as shown in block 170. Once the system checks if the product to be released meets all the requirements, the system then releases the product to the end user, as shown in block 180.

In one aspect, each stage of the development process may include a quality based risk validation, wherein the resulting product from each stage is subjected to a risk validation to assess the quality of the product and determine the risk of failure. Based on the outcome of the quality based risk assessment, the system generates reports for further analysis and improvement.

Figure 2A:
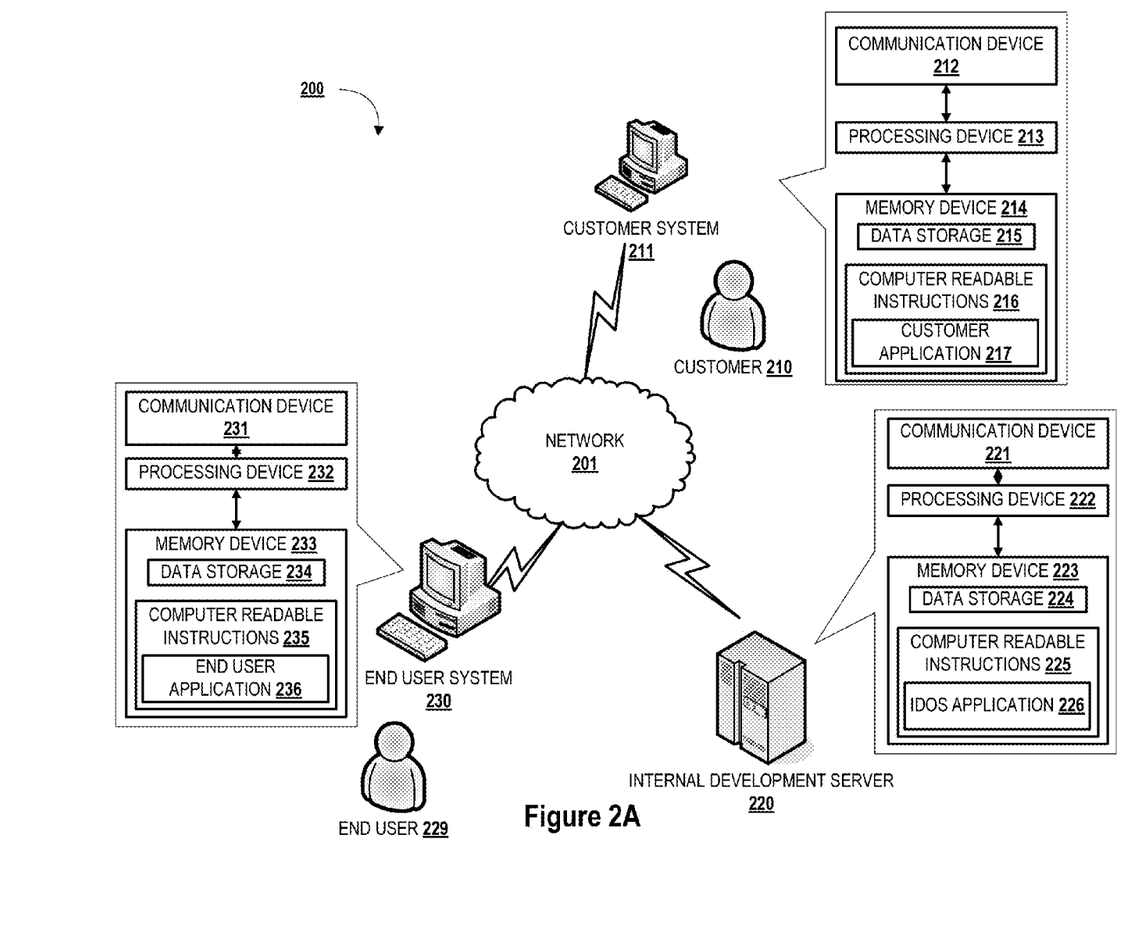
FIG. 2A provides an illustration of a system environment for integrated development and operations solution, in accordance with one embodiment of the present invention.

FIG. 2A illustrates an integrated development and operations solution system environment 200, in accordance with one embodiment of the present invention. As illustrated in FIG. 2A, the internal development server 220 is operatively coupled via a network 201 to the customer system 211, and the end user system 230. In this way, the internal development server 220 can send information to and receive information from the customer system 211, and the end user system 230. FIG. 2A illustrates only one example of an embodiment of the integrated development and operations solution system and environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wired, wireless, or a combination of wired and wireless communication between devices on the network.

In some embodiments, the customer 210 is an individual initiating an application development process through the customer system 211. In one aspect, the end user 229 may a financial institution employee and may desire to use an application developed using the integrated development and operations solution on the end user system 230.

As illustrated in FIG. 2A, the internal development server generally comprises a communication device 221, a processing device 222, and a memory device 223. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 222 is operatively coupled to the communication device 221 and the memory device 223. The processing device 222 uses the communication device 221 to communicate with the network 201 and other devices on the network 201, such as, but not limited to the end user system 230, and the customer system 211. As such the communication device 221 generally comprises a modem, server, or other device for communicating with other devices on the network 201.

As further illustrated in FIG. 2A, the internal development server 220 comprises computer-readable instructions 225 of an integrated development and operations solution (IDOS) application 226. In some embodiments, the memory device 223 includes a data storage 224 for storing data related to the system for an integrated development and operations solution.

FIG. 2A also illustrates a customer system 211. The customer system 211 generally comprises a communication device 212, a processing device 213, a memory device 214, and a customer application 217. The processing device 213 is operatively coupled to the communication device 212 and the memory device 214. The processing device 213 uses the communication device 212 to communicate with the network 201 and other devices on the network 201, such as, but not limited to the end user system 230, and the internal development system 220. As such, the communication device 212 generally comprises a modem, server, or other device for communicating with other devices on the network 201. As illustrated in FIG. 2A and described throughout much of this specification, the customer 210 may communicate via a network 201, through a customer system 211, a customer service request for building an application. This request is communicated to the internal development server 220 via a communication device 212. In response to receiving the customer service request, the internal development server 220 may use the IDOS application 226 to develop the application based on at least one of a customer service request. In response to developing the application, the IDOS application 226 may release the application via the network 201, on the end user system 230. In some embodiments, the end user 230 may communicate, via a network 201, to the customer 210, for any further changes or addition to the application.

Figure 2B:
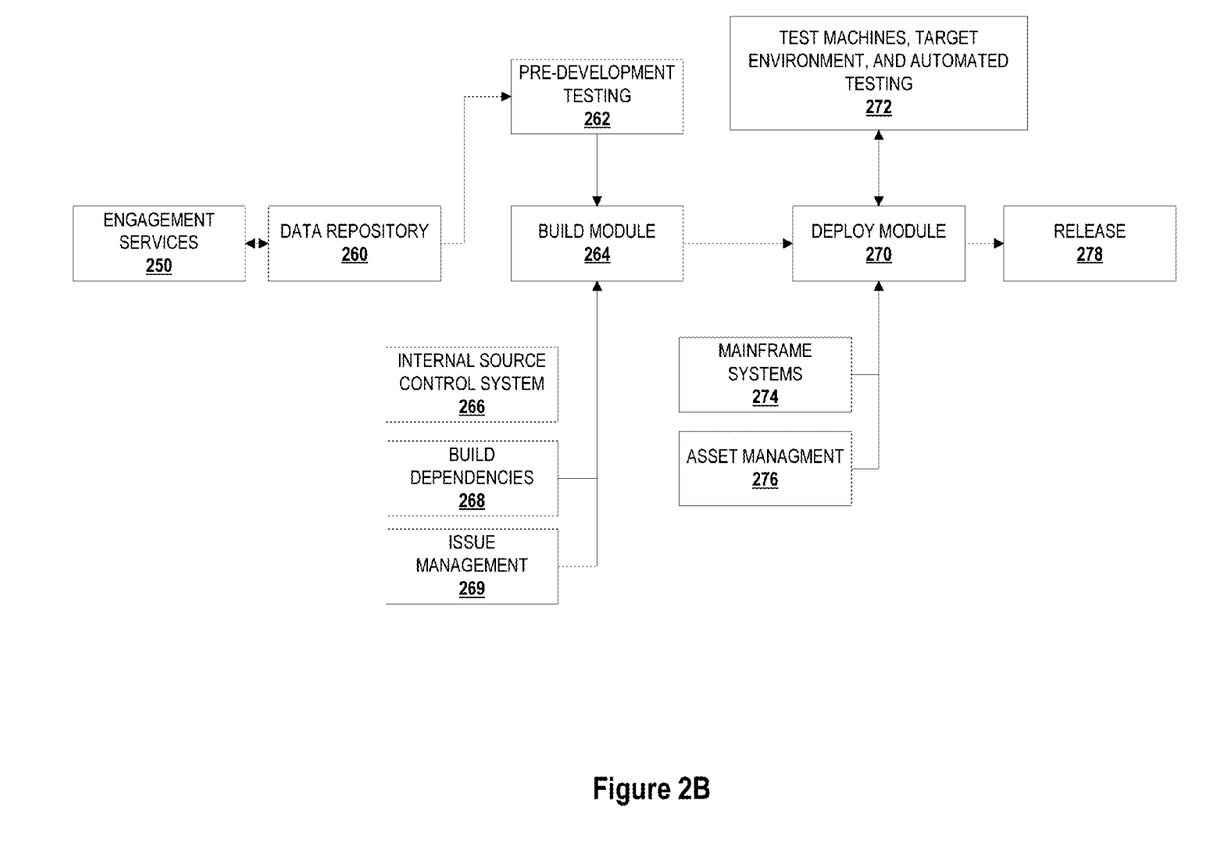
FIG. 2B provides a process flow of the system for integrated development and operations solutions, in accordance with one embodiment of the present invention.

FIG. 2B illustrates an overview of the IDOS 226 process flow. When customer service request is received, the system employs the engagement services 250 to identify the functional and non-functional requirements associated with the customer service request. In some embodiments, in response to identifying the functional and non-functional requirements, a developer may check-in source code into a data repository 260. In some embodiments, the engagement services 250 may manage triggers associated with the data repository. Typically, triggers are responses to specific events that take place in the IDOS. For example, a trigger may be running a code quality scan when a source code is checked in to the data repository 260. In response to source code check-in in the data repository 260, the code may be retrieved from the data repository 260 and staged for build in the build module 264. Typically, a build module 264 may be defined as the process of developing the source code by a developer based on at least the requirements received from the engagement services 250, and converting the source code files into a product capable of being deployed. In some embodiments, internal source control systems 266, build dependencies 268, and issue management 269 may be integrated with the build module 264. Typically, internal source control systems are third party software applications that are used to manage and track the application development process. In some embodiments, one or more aspects of the application development may be dependent on one or more other aspects of the application development. The build dependencies 268 are used to manage such aspects of the system. In some embodiments, issue management establishes a consistent set of procedures to capture, evaluate, investigate, and track issues. Further, issue management may bring visibility, accountability, and timely resolution of issues. For example, an issue may be a bug in the source code, defect in the execution of the source code, infrastructure defects, or the like. The product is then stored in a repository in the build module 264.

As illustrated in FIG. 2B, the product is deployed using the deploy module 270. In some embodiments, the deploy module 270 may integrate one or more mainframe systems 274 during deployment. In one aspect, product is deployed in test machine/target environment 272 and tested to determine if the product meets the functional and non-functional requirements identified. In one aspect, the system integrates asset management 276 with the deploy module 270, before releasing the product to the end user in 278. In some embodiments, asset management 276 may be used to determine the infrastructure requirements associated with the product.

Figure 3:
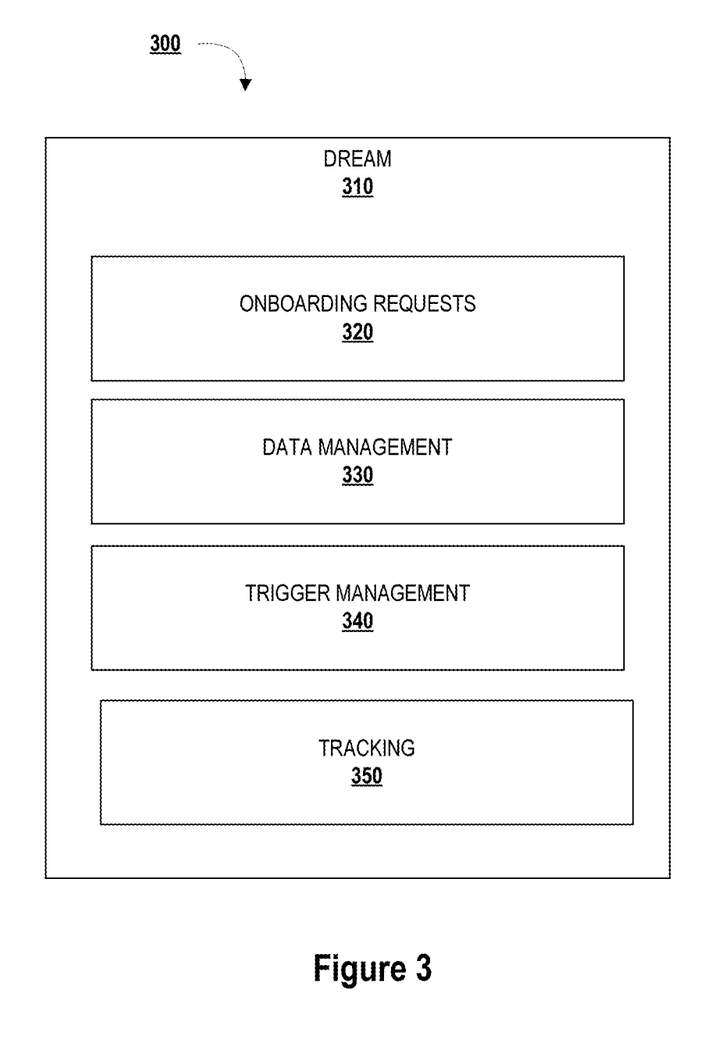
FIG. 3 provides an illustration of the development and operations release engineering and automation management (DREAM) module for integrated development and operations solution, in accordance with one embodiment of the present invention.

FIG. 3 illustrates the development and operations release engineering and automation management (DREAM) 300 of the engagement services 250. Typically, a customer 210 is assigned an engagement manager. The engagement manager may manage the contractual relationship between the customer 210 and the vendor. The engagement manager may work with the vendor to ensure that the services delivered conform to the requirements defined by the customer 210. Further, the engagement manager may monitor delivery of said services against a mutually agreed schedule, quality, scope, and budget. In some embodiments, the engagement manager may DREAM module 300 to keep track of any and all actions taken during the development of the application, as shown in block 213. Typically, the DREAM module 300 is used to manage a portfolio associated with a client. A portfolio may include planned initiatives, projects, and ongoing IT services (such as application support) associated with one or more clients.

As shown in block 320, in some other embodiments, the DREAM module 310 may track one or more on-boarding requests as received from the customer 210. Typically, on-boarding requests are achieved by implementing an internal framework that may deal with account opening, on-boarding formalities, document management, data collection, and the like. In some embodiments, on-boarding requests may include on-boarding build request, on-boarding deploy request, and/or on-boarding support request. This may include, but not restricted to identifying infrastructure requirements, upfront data requirements, and personnel requirements.

In some embodiments, the DREAM module 310 may include data management 230. In one aspect, the data management 330 may include collection of data around the gates associated with the process. In some other embodiments, the data management 330 may include identifying resources such as server requirement. In one aspect, the servers may be a cloud infrastructure. In another aspect, the servers may be a physical hardware. In some other embodiments, the DREAM module 310 may include trigger management 340. Typically, triggers are procedural code automatically executed in response to certain events during the application development process. In some embodiments, a developer may set up triggers specifically to begin the build process when a code is checked in. For example, a trigger can be set to begin the build process when a code is checked in to a repository in such a way that the system may wait for a per-defined amount of time (say 30 seconds) to verify that no new version of the code has been checked in, and begin the build process automatically. In one aspect, the DREAM module 310 may include a tracking module 350. Typically, a tracking module may be used to identify the personnel involved in specific tasks pertaining to specific requests, or the application as a whole. For example, if a customer 210 requires a change implementation in an existing application after say three months, the DREAM module 310 may be used to identify the last few requests and the personnel that worked on the request to direct accordingly, as the personnel who worked on the request last are more likely to be most familiar with the application. In some embodiments, the tracking module 350 may also track the data associated with the on-boarding requests. Typically, the information collected using the DREAM module 310 is integrated with one or more internal source control systems (ISCS) to begin the automation process to build, deploy, and release the application. In some embodiments, ISCS may be off-the-shelf software tools capable to tracking and controlling changes in the software as part of the larger configuration management. In some other embodiments, the ISCS may be used to set up triggers in accordance with the customer 210 requirements to automate the build process on a build server.

Figure 4:
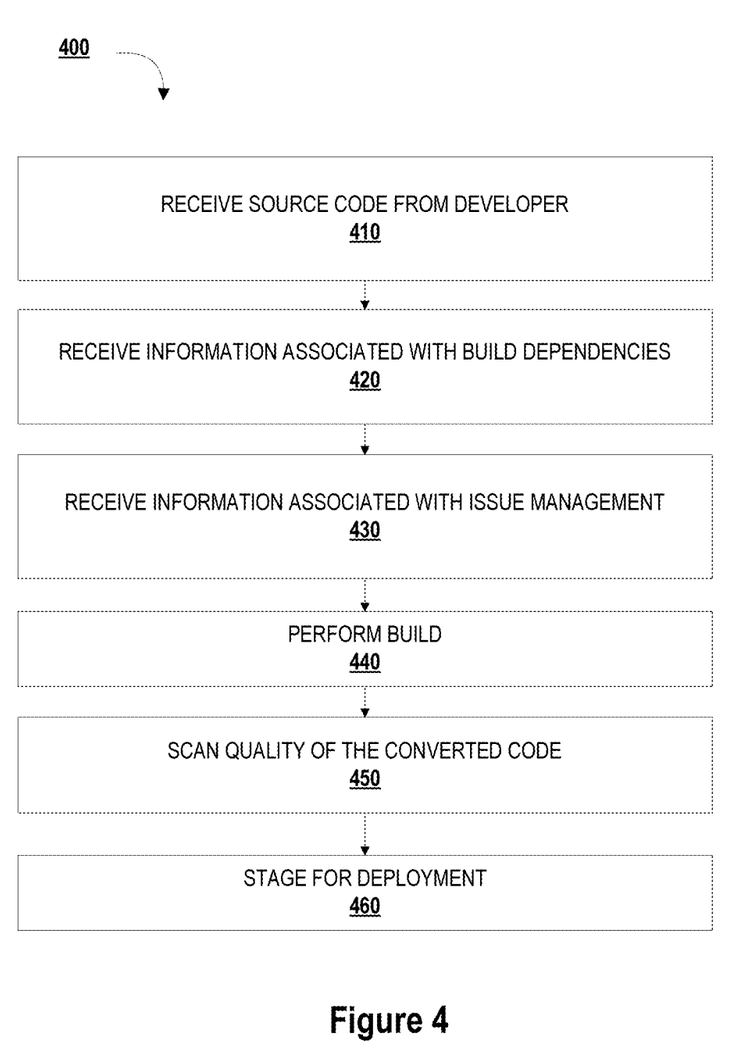
FIG. 4 provides a process flow for creating a build in the integrated development and operations solution, in accordance with one embodiment of the present invention.

FIG. 4 illustrates the build process as part of the automation services 400. Typically, the automation services are designed to improve lifecycle quality and momentum by allowing increased developer productivity through automation, parallelization, and standardized, repeatable process. This service provides the required separation of duties by offering build/release subservices in all environments, continuous integration capabilities, on-demand code deployments, and integrated regression testing. The service aims to achieve increased feature velocity, increased developer productivity, reduced time to market throughout the lines of business (LOBs), full audit tracking, immediate results, and decreased production incidents. First, as shown in block 410, the system may receive source code from a developer. Most applications are distributed in a form that includes executable files. In some embodiments, the source code is included to enable a system administrator, or a programmer to modify the program or understand how it works. In one aspect, the source code may be subject to pre-development testing. Typically, pre-development testing is a software development process that relies on the repetition of a very short development cycle. In some embodiments, the pre-development testing may be used to identify bugs and issues with the source code. In some other embodiments, the pre-development testing may be used to define an improvement or a new function. Typically, the pre-development testing process is integrated with the one or more source control systems. Further, pre-development testing results are communicated back to the developer for any additional changes. If a source code passes the pre-development testing, it is checked in to a repository, and staged for build and eventual deployment.

In some embodiments, the system may receive information associated with build dependencies, as shown in block 420. Typically, build dependencies are used to identify one or more aspects of the application development that depend on one another. For example, there may be more than one group within the application development team duplicating certain functionality. Build dependencies may be used to identify and integrate such objects into the application development process to obtain superior quality and functionality. An example of a dependency object is third party libraries that may be required to develop the application. In some embodiments, the build dependencies may handle storage and distribution of the objects involved.

In another aspect, the system may receive information associated with issue management, as shown in block 430. Typically, issue management is used to monitor and review the build, identify issues, create and manage a log of the issues identified, communicate the issue to the developer involved, and remove the issue. This may be achieved by pre-approved software tracking systems. In one aspect, one or more issues reported may be integrated into the build process by extracting them from the reports as metadata and exporting them as artifacts.

In response to receiving the artifacts and the checked in code, the system performs the build process, as shown in block 440. In some embodiments, the build process may be executed in a build farm. Typically, a build farm is a collection of one or more servers set up to compile source code remotely to make the build process easier and uniform. For example, when developing source code that runs on multiple processor architectures and operating systems, it may be advantageous for the developer to run the source code on a build farm in a uniform method. Further, build farms may be used to run operations in parallel on separate machines, thereby saving time and resources.

In response to performing the build process, the system scans the quality of the build-time converted code, as shown in block 450. In some embodiments, in addition to scanning the quality of the build time converted code, the system may run other build-time tests such as fortified security scanning, identify open source signatures for proprietary usage of code, and/or the like. Typically, a development manager may review the code quality metrics and determine if any further action is required.

As shown in block 460, the run-time code built is then secured, versioned, and moved into a repository and staged for deployment on a deployment server. In some embodiments, the build process may be integrated with the DREAM module 310 to incorporate various initial trigger set up. In some other embodiments, the build process may integrate with additional build objects such as content systems, application configurations, and/or the like.

Figure 5:
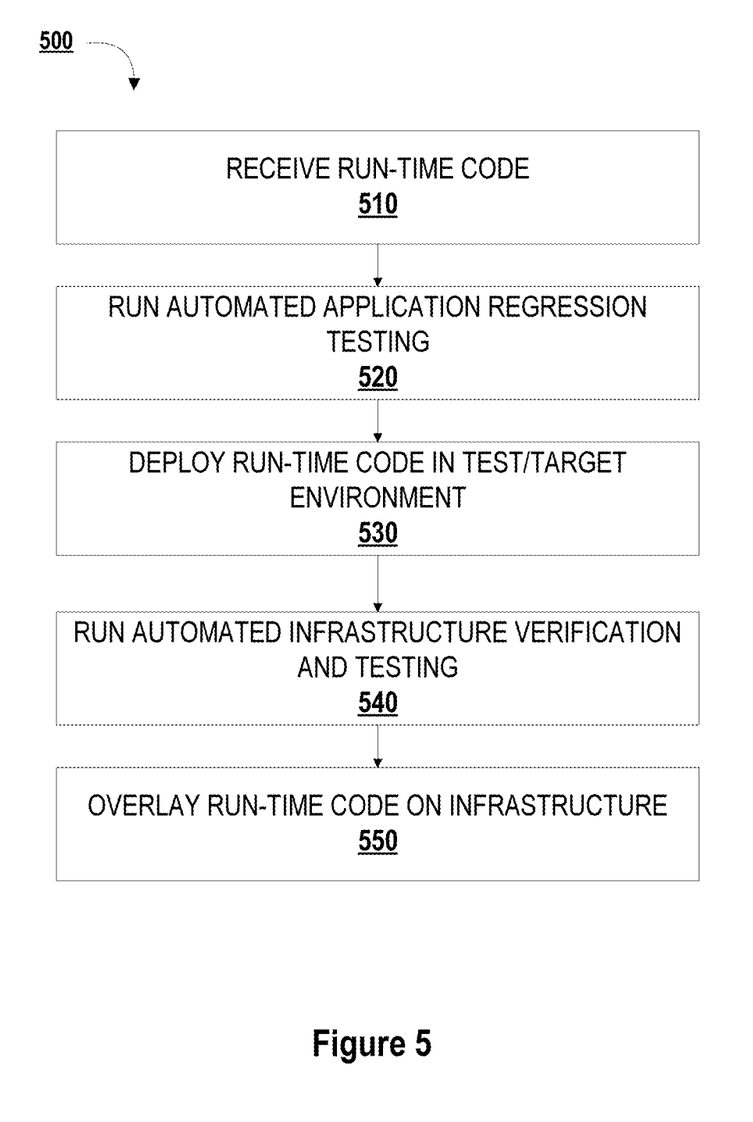
FIG. 5 provides a process flow for build deployment in the integrated development and operations solution, in accordance with one embodiment of the present invention.

FIG. 5 illustrates the deployment process as part of the automation services 500. In some embodiments, a deployment server may receive the run-time code from the repository of the build server, as shown in block 510. In response to receiving the run-time code, the system may run automated application regression testing, as shown in block 520. Typically, the application regression testing is a quality center regression test that is used to check the integrity of the code. Further, the application regression testing is used to uncover new software bugs in existing functional and non-functional areas of a system after changes such as enhancements, patches, configuration changes, and/or the like. In some embodiments, the system may use any one or more regression testing techniques such as application verification process (AVP), critical regression (CR), and optimized regression (OP). In some embodiments, a successful test result is determined if the application meet the functional and non-functional requirements identified. In one aspect, if the application does not meet the functional and non-functional requirements, the team responsible for the particular aspect of the application that failed the regression testing is notified and immediate action is taken to rectify the issue.

In response to a successful test result, the system may then deploy the run-time code in a test machine/target environment, as shown in block 530. Typically, a test machine/target environment is a setup of software and hardware on which the run-time code testing is performed. A test machine is a single machine on which individual run-time code batches are tested. A target environment is a run time environment for integrated functional testing. A target environment definition is not limited to defining one physical system. In some embodiments, a target environment may have one physical system to load one or more run-time applications, but have varying environments that the one or more application should run in. For these various environments, the one or more applications may have to be built and loaded differently. In some embodiments, the target environment may be used to run integrated testing with multiple applications running simultaneously, each dependent on one another. Further, a target environment provides a flexible framework to capture any unique and sharable application development setup requirement.

Once the run-time code is deployed and tested successfully on test/target environments, the system may run automated infrastructure verification and testing, as shown in block 540 to ensure proper infrastructure requirement. In some embodiments, the vendor may build a "gold copy" server with hardware and software specifications that match the hardware and software specifications of the customer 210. In response to a positive test result, the run-time code is overlaid on the infrastructure, as shown in block 550. In some embodiments, the deploy server may be integrated with one or more back-end mainframe systems to enable tracking and coordination of the deployment process.

In some embodiments, the system may include asset management comprising at least one of an environment configuration, asset configuration, drift management, asset relationship, environment gold copy, and/or the like. These components are a specific arrangement of hardware, software and the associated environment settings required to conduct accurate tests that enable the evaluation of the target test application. For example, as part of a new project, an application may require a number of servers built in a particular way capable of executing the application. Further, the components may be used to maintain an understanding of the status of complex assets with a view to maintaining the highest level of serviceability for the lowest cost. Specifically, the components aim to ensure that operations are not disrupted due to the asset (or parts of the asset) overrunning limits of planned lifespan or below quality levels. Further, asset management delivers IT asset inventories and relationships to produce fundamental processes, services, and tools, which support other development lifecycles and architecture services. In some embodiments, the asset management also delivers environment gold copies of the configuration items. In addition, asset management establishes the process that focuses on identifying, collecting, controlling, maintaining, and verifying all physical, logical or virtual components of the IT infrastructure and their relationships to each other. Also, these components further ensure that the hardware and software components throughout the development of the application do not "drift" in such a way that system integration is not achieved. In some embodiments, these components allow sharing and enforcement of best practices, inventory, resources and personnel to enable optimization of assets and maximize return on investment.

Figure 6:
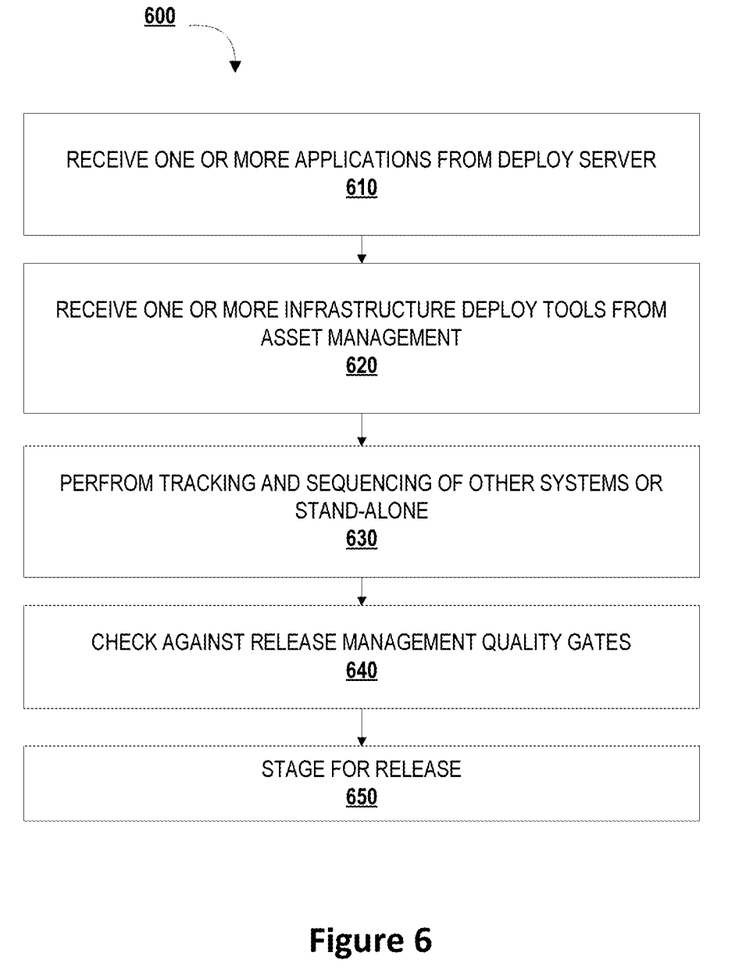
FIG. 6 provides a process flow for release orchestration in the integrated development and operations solution, in accordance with one embodiment of the present invention.

FIG. 6 shows the release orchestration aspect of the system 600. Typically, the release management component of the solution enables the release managers to have transparency of change and prevents duplication of process. In some embodiments, release management may have a record of all deployments to production as well as information of upcoming deadlines for change deployment and quality checkpoints. Further, release managers may have the ability to see sequencing requirements as well as visibility into the current state and quality of all change in environments. In addition, the solution may provide control information so that changes occurring throughout the development process do not conflict with one another. As shown in block 610, in some embodiments, the system may receive one or more applications from the deploy server. In one aspect, the application development process may include the development and release of one application. In another aspect, the application development process may include the development and release of a plurality of applications, integrated, and dependent on each other. The system as shown further receives one or more infrastructure deploy tools from asset management, as shown in block 620 to manage multiple applications in a release and still maintain dependencies between the applications. In some embodiments, the release orchestration may coordinate versions of the application with the version of its back-end system and the mainframe system. As show in block 630, the system may perform tracking and sequencing of other systems and/or stand-alone systems. In some embodiments, the release orchestration may manage a complex set of release steps between the application and the infrastructure. In some other embodiments, the release orchestration may manage a release steps within an application itself. In one aspect, the release orchestration may include one or more manual actions required to manage a release. In response to tracking and sequencing, as shown in block 640, the system may check against release management quality gates. In response to a positive quality check, the system may stage the application for release, as shown in block 650. Typically, the release manager orchestrates release activities, manages the release and helps deploy the application to the end user 230.

Figure 7:
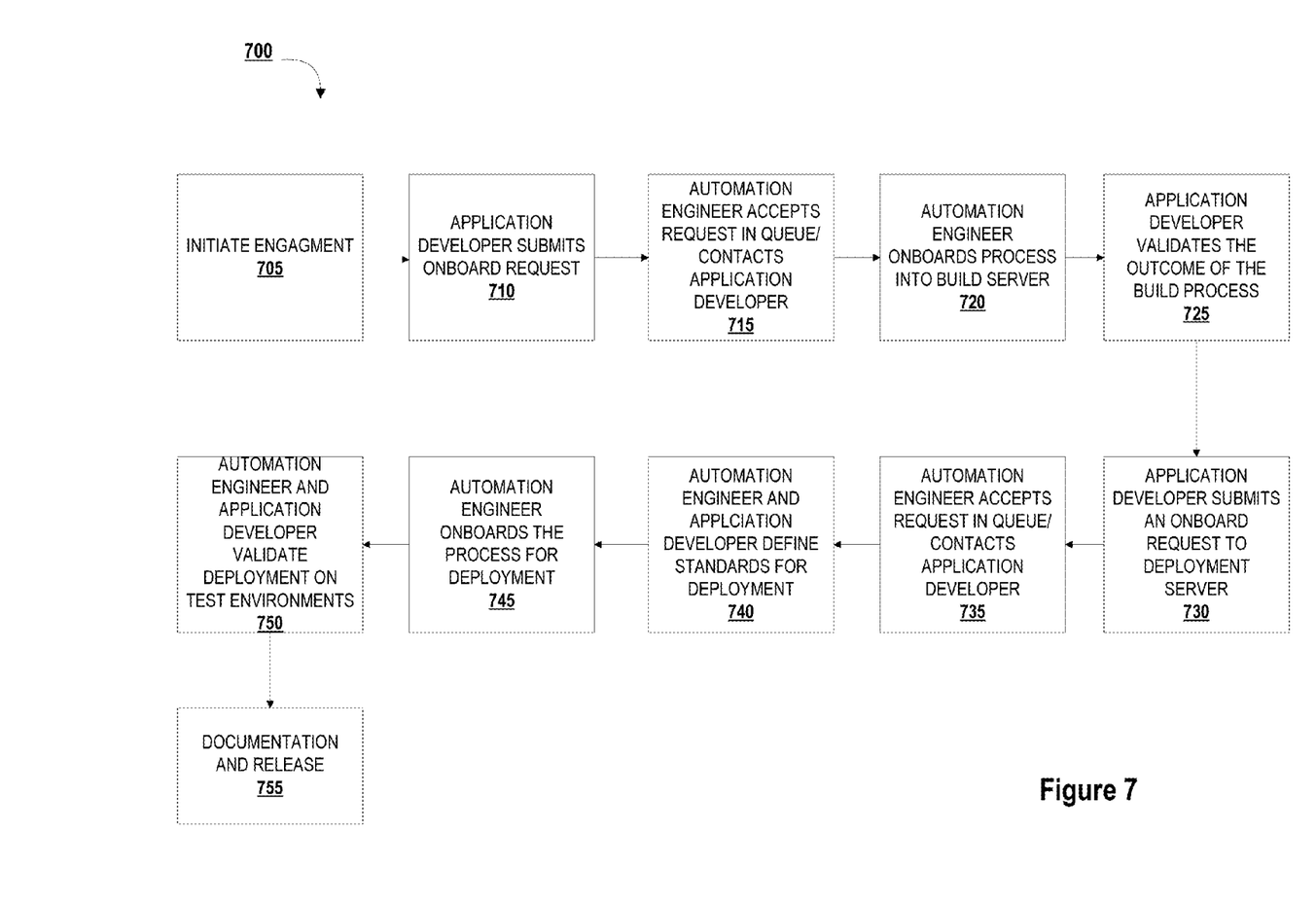
FIG. 7 provides a high level overview of the on-boarding process to be initiated by the development team.

FIG. 7 shows a high level overview of the on-boarding process to be initiated by the development team 700. In some embodiment, the customer 210 may approach the development team with a customer request for at least one of a change implementation or application development. As shown in block 705, the development team initiates an engagement with the customer 210. In response to the application developer may submit an on-board request to the build server via the DREAM 300 portal, as shown in block 710. On-boarding is the process of empowering the developers with the resources required and a fully functional development environment to execute the customer request. In response to the application developer's on-board request, the automation engineer accepts the request in a queue, analyses the information, and contacts the application developer to set tangible expectations on delivery of the application post build, as shown in block 715. In some embodiments, the automation engineer works with the application developer to identify automation processes that meet application developer needs. In some embodiments, in response to accepting the request and setting expectations, the automation engineer on-boards the process into the build server, as shown in block 720. In response to on-boarding the process into the build server, the build process is initialized. In some embodiments, the application developer validates the outcome of the build process, as shown in block 725. In one aspect, after successful validation of the product from the build process, the application developer submits an on-board request to the deployment server via the DREAM 300 portal, as shown in block 730.

In response to an on-board request submission by the application developer, the automation engineer then accepts the request in a queue, reviews the information, contacts the application developer to set tangible expectations on delivery post deployment, as shown in block 735. In response to accepting the request and setting expectations, the automation engineer works with the application developer to define standard a deployment process (e.g. defining system configurations, drift management, or the like) as needed, as shown in block 740. In response to setting standards, the automation engineer on-boards the process into the deployment server, as shown in block 745. In response to on-boarding the process, the application developer and the automation engineer validate the deployment in as many test environments as possible, as shown in block 750. Finally, after successful validation of the deployment, the process is ready for documentation and release, as shown in block 755.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, unscripted programming languages, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#. In some embodiments, scripting languages such as COBOL and JCL may be used for mainframe operations. In some other embodiments, Korn Shell scripting may be used within the Unix space.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer implemented method for integrated development and operations solution, the method comprising:
   receiving a customer service request, wherein the customer service request includes a request to develop, change, or update a product;
   identifying, via a computer processor, one or more requirements necessary to execute the customer service request, wherein the one or more requirements include at least one of a functional and non-functional requirement, wherein functional requirements include product performance within a deployed environment and non-functional requirements include criteria that is used to judge the product performance within the deployed environment;
   retrieving data associated with the one or more requirements from a data repository and creating a build, wherein the data retrieved includes a source code for the product and wherein creating a build includes converting the data associated with the one or more requirements into a product capable of being deployed;
   determining that a build is successful, wherein determining that a build is successful includes the build passing a threshold based quality assessment associated with the functional and non-functional requirements;
   presenting unsuccessful builds with identified fixes identified from the threshold based quality assessment;
   staging the product for deployment, wherein staging includes pre-processing of the product for entity wide deployment and deploying the product in a test environment;
   correlating test environment results of the product to the functional and non-functional requirements identified from the customer service request;
   deploying the product based at least in part on one or more of the functional and non-functional requirements being met in the test environment; and
   releasing the product to end user.

2. The computer-implemented method of claim 1, wherein the threshold based quality assessment to determine a successful build includes:
   subjecting the build to at least one build-time code quality scan;
   comparing the result to a pre-defined threshold, wherein pre-defined threshold is one or more errors; and
   determining if the build passes the pre-defined threshold.

3. The computer-implemented method of claim 1, wherein determining a successful deployment further includes:
   deploying the product created by the successful build in the plurality of test environments;
   comparing the functionality of the product deployed to the functional and non-functional requirements; and
   determining based on the comparison, that the product deployed satisfies the functional and non-functional requirements and is error free.

4. The computer-implemented method of claim 3, wherein the plurality of test environments further include:
   one or more test machines, wherein the one or more test machines is a simulation of an environment similar to an environment in which the application is to operate; and
   a target environment, wherein target environment is a simulation an environment similar to the environment in which one or more applications dependent on each other in an integrated manner are to operate.

5. A system for integrated development and operations solution, the system comprising:
   a memory device with computer-readable program code stored thereon;
   a communication device;
   a processing device operatively coupled to the memory device and the communication device, wherein the processing device is configured to execute the computer-readable program code to:
      receive a customer service request, wherein the customer service request includes a request to develop, change, or update a product;
      identify one or more requirements necessary to execute the customer service request, wherein the one or more requirements include at least one of a functional and non-functional requirement, wherein functional requirements include product performance within a deployed environment and non-functional requirements include criteria that is used to judge the product performance within the deployed environment;

retrieve data associated with the one or more requirements from a data repository and create a build, wherein the data retrieved includes a source code for the product and wherein creating a build includes converting the data associated with the one or more requirements into a product capable of being deployed;

determine that a build is successful, wherein determining that a build is successful includes the build passing a threshold based quality assessment associated with the functional and non-functional requirements;

present unsuccessful builds with identified fixes identified from the threshold based quality assessment;

stage the product for deployment, wherein staging includes pre-processing of the product for entity wide deployment and deploying the product in a test environment;

correlate test environment results of the product to the functional and non-functional requirements identified from the customer service request;

deploy the product based at least in part on one or more of the functional and non-functional requirements being met in the test environment; and release the product to end user.

6. The system of claim 5, wherein the threshold based quality assessment to determine a successful build includes:
subjecting the build to at least one build-time code quality scan;
comparing the result to a pre-defined threshold, wherein pre-defined threshold is one or more errors; and
determining if the build passes the pre-defined threshold.

7. The system of claim 5, wherein determining a successful deployment further includes:
deploying the product created by the successful build in the plurality of test environments;
comparing the functionality of the product deployed to the functional and non-functional requirements; and
determining based on the comparison, that the product deployed satisfies the functional and non-functional requirements and is error free.

8. The system of claim 7, wherein the plurality of test environments further include:
one or more test machines, wherein the one or more test machines is a simulation of an environment similar to an environment in which the application is to operate; and
a target environment, wherein target environment is a simulation an environment similar to the environment in which one or more applications dependent on each other in an integrated manner are to operate.

9. The system of claim 5, wherein the product to be developed is at least one of a single application, an integration of a plurality of applications, or a change implementation.

10. The system of claim 5, wherein the build process and the deploy process are automatically triggered based on at least the functional and non-functional requirements identified.

11. The system of claim 5, wherein creating a build further includes at least one of identifying build dependencies and integrating the build dependencies with the build automatically and integrating reports generated by issue management into the build automatically.

12. The system of claim 5, wherein deployment is integrated with at least one of a plurality of mainframe systems, wherein the plurality of mainframe systems is a back-end server.

13. A computer program product for integrated development and operations solution, the computer program product comprising at least one non-transitory computer-readable medium having computer-readable program code portions embodied therein, the computer-readable program code portions comprising:
an executable portion configured for receiving a customer service request, wherein the customer service request includes a request to develop, change, or update a product;
an executable portion configured for identifying one or more requirements necessary to execute the customer service request, wherein the one or more requirements include at least one of a functional and non-functional requirement, wherein functional requirements include product performance within a deployed environment and non-functional requirements include criteria that is used to judge the product performance within the deployed environment;
an executable portion configured for retrieving data associated with the one or more requirements from a data repository and creating a build, wherein the data retrieved includes a source code for the product and wherein creating a build includes converting the data associated with the one or more requirements into a product capable of being deployed;
an executable portion configured for determining that a build is successful, wherein determining that a build is successful includes the build passing a threshold based quality assessment associated with the functional and non-functional requirements;
an executable portion configured for presenting unsuccessful builds with identified fixes identified from the threshold based quality assessment;
an executable portion configured for staging the product for deployment, wherein staging includes pre-processing of the product for entity wide deployment and deploying the product in a test environment;
an executable portion configured for correlating test environment results of the product to the functional and non-functional requirements identified from the customer service request;
an executable portion configured for deploying the product based at least in part on one or more of the functional and non-functional requirements being met in the test environment; and
an executable portion configured for releasing the product to end user.

14. The computer program product of claim 13, wherein the threshold based quality assessment to determine a successful build includes:
subjecting the build to at least one build-time code quality scan;
comparing the result to a pre-defined threshold, wherein pre-defined threshold is one or more errors; and
determining if the build passes the pre-defined threshold.

15. The computer program product of claim 13, wherein determining a successful deployment further includes:
deploying the product created by the successful build in the plurality of test environments;
comparing the functionality of the product deployed to the functional and non-functional requirements; and
determining based on the comparison, that the product deployed satisfies the functional and non-functional requirements and is error free.

16. The computer program product of claim 15, wherein the plurality of test environments further include:

one or more test machines, wherein the one or more test machines is a simulation of an environment similar to an environment in which the application is to operate; and a target environment, wherein target environment is a simulation an environment similar to the environment in which one or more applications dependent on each other in an integrated manner are to operate.

17. The computer program product of claim 13, wherein the product to be developed is at least one of a single application, an integration of a plurality of applications, or a change implementation.

18. The computer program product of claim 13, wherein the build process and the deploy process are automatically triggered based on at least the functional and non-functional requirements identified.

* * * * *